United States Patent
Xiang

(10) Patent No.: US 10,510,104 B2
(45) Date of Patent: Dec. 17, 2019

(54) DEVICES AND METHODS FOR ACQUIRING DATA COMPARISON INFORMATION

(71) Applicant: TENCENT TECHNOLOGY (SHENZHEN) COMPANY LIMITED, Shenzhen, Guangdong (CN)

(72) Inventor: Guoyi Xiang, Guangdong (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 542 days.

(21) Appl. No.: 15/175,854

(22) Filed: Jun. 7, 2016

(65) Prior Publication Data
US 2016/0292766 A1 Oct. 6, 2016

Related U.S. Application Data

(63) Continuation of application No. PCT/CN2014/093113, filed on Dec. 5, 2014.

(30) Foreign Application Priority Data

Apr. 18, 2014 (CN) .......................... 2014 1 0159303

(51) Int. Cl.
G06Q 30/06 (2012.01)
G06Q 30/02 (2012.01)
(Continued)

(52) U.S. Cl.
CPC ......... G06Q 30/0629 (2013.01); G06Q 30/02 (2013.01); G06Q 50/01 (2013.01); H04L 51/00 (2013.01); H04L 51/32 (2013.01)

(58) Field of Classification Search
CPC .... G06Q 30/06; G06Q 30/0629; G06Q 50/01; H04L 51/00; H04L 51/32
(Continued)

(56) References Cited

U.S. PATENT DOCUMENTS 7,792,709 B1    9/2010  Trandal et al.
2009/0182643 A1*  7/2009  Holstein ................ G06Q 30/02
                                                      705/26.1
(Continued)

FOREIGN PATENT DOCUMENTS

CN    102004979 A    4/2011
CN    102479368 A    5/2012
(Continued)

OTHER PUBLICATIONS

Molly, B.W."Don't ring the QR code death knell just yet"; published in Fierce MobileIT, Publisher Questex, LLC, Publication date Jan. 23, 2014; Published at Newton USA. Article extracted from PQ Dialog on Aug. 8, 2019.*

(Continued)

*Primary Examiner* — Yogesh C Garg
(74) *Attorney, Agent, or Firm* — Morgan, Lewis & Bockius LLP

(57) ABSTRACT

Devices and methods are provided for acquiring data comparison information. For example, a session window of a preset account is switched to in a social networking application, wherein the preset account is configured to provide an inquiry service for a target account; first commodity information for price comparison input into the session window by a user is acquired, wherein the first commodity information is sent to the preset account by the target account and the target account corresponds to a client account of the social networking application used by the user; the first commodity information for price comparison is sent to a server, so that the server determines whether a price comparison result associated with the first commodity information for price comparison is saved; the price comparison result sent by the server is received; and the price comparison result is displayed in the session window.

7 Claims, 9 Drawing Sheets

(51) Int. Cl.
    *H04L 12/58* (2006.01)
    *G06Q 50/00* (2012.01)
(58) Field of Classification Search
    USPC .......................................... 705/26.64, 26.61
    See application file for complete search history.

(56) References Cited

U.S. PATENT DOCUMENTS

| | | | | |
|---|---|---|---|---|
| 2011/0276385 | A1* | 11/2011 | Keller | G06Q 20/202 705/14.38 |
| 2011/0313946 | A1* | 12/2011 | Browne | G06Q 20/10 705/36 R |
| 2013/0254215 | A1* | 9/2013 | Davar | G06F 17/30861 707/748 |
| 2014/0316824 | A1* | 10/2014 | Tkatch | G06Q 40/08 705/4 |

FOREIGN PATENT DOCUMENTS

| | | | | |
|---|---|---|---|---|
| CN | 103152331 A | * | 6/2013 | ............ H04L 29/06 |
| CN | 103646565 A | | 3/2014 | |
| CN | 103679516 A | | 3/2014 | |

OTHER PUBLICATIONS

International Search Report & Written Opinion of the ISA for PCT/CN2014/093113, Haidian District, Beijing, dated Mar. 9, 2015.
Gan, Yujian et al.: "Design and Implementation of Intelligent Wechat Public Platform for Bank," Software Guide, vol. 13, No. 2, Feb. 2014, pp. 6-8.
Xia, Yu et al.: "Student Assistant System Based on the WeChat Public Platform," Computer & Telecommunication, No. 11, Nov. 2013, pp. 857-864.
First Chinese Office Action regarding Application No. 201410159303.8 dated Nov. 6, 2015. English translation provided by Unitalen Attorneys at Law.

* cited by examiner

DEVICES AND METHODS FOR ACQUIRING DATA COMPARISON INFORMATION

CROSS-REFERENCES TO RELATED APPLICATIONS

The application is a Continuation application of PCT application No. PCT/CN2014/093113 filed on Dec. 5, 2014, which claims priority to Chinese Patent Application No. 201410159303.8 filed Apr. 18, 2014, both of which are incorporated by reference herein for all purposes.

BACKGROUND OF THE INVENTION

Certain embodiments of the present invention are directed to computer technology. More particularly, some embodiments of the invention provide devices and methods for network technology. Merely by way of example, some embodiments of the invention have been applied to data comparison. But it would be recognized that the invention has a much broader range of applicability.

With the development of the Internet, more and more people choose to use the Internet for shopping. During on-line shopping, different commodities often need to be compared. At present, an application for price comparison is often provided, and a user can obtain a price comparison result by inputting a name of a commodity for price comparison into the price comparison application installed on a terminal. Or, the user obtains a price comparison result by logging into a price comparison website through a browser and inputting a name of a commodity for price comparison into the price comparison website.

The above-noted conventional technology has some disadvantages. For example, if a user mentions a commodity for price comparison during an online live chat process using a live chat application, the user may need to exit the live chat application, open a price comparison application or open a browser and log in a price comparison website, and finally input the commodity information for price comparison into the price comparison application or the price comparison website. The whole process includes many steps and is often cumbersome.

Hence it is highly desirable to improve the techniques for acquiring data comparison information.

BRIEF SUMMARY OF THE INVENTION

According to one embodiment, a method is provided for acquiring data comparison information. For example, a session window of a preset account is switched to in a social networking application, wherein the preset account is configured to provide an inquiry service for a target account; first commodity information for price comparison input into the session window by a user is acquired, wherein the first commodity information is sent to the preset account by the target account and the target account corresponds to a client account of the social networking application used by the user; the first commodity information for price comparison is sent to a server, so that the server determines whether a price comparison result associated with the first commodity information for price comparison is saved; the price comparison result sent by the server is received; and the price comparison result is displayed in the session window.

According to another embodiment, a method is provided for acquiring data comparison information. For example, first commodity information for price comparison sent by a terminal is received; whether a price comparison result associated with the first commodity information for price comparison is saved is determined; and in response to the price comparison result being saved, the price comparison result is sent to the terminal.

According to yet another embodiment, a device for acquiring data comparison information includes: a switching unit configured to switch to a session window of a preset account in a social networking application, wherein the preset account is configured to provide an inquiry service for a target account; an acquisition unit configured to acquire first commodity information for price comparison input into the session window by a user, wherein the first commodity information is sent to the preset account by the target account and the target account corresponds to a client account of the social networking application used by the user; a sending unit configured to send the first commodity information for price comparison to a server, so that the server determines whether a price comparison result associated with the first commodity information for price comparison is saved; a reception unit configured to receive the price comparison result sent by the server; and a display unit configured to display the price comparison result in the session window.

According to yet another embodiment, a device for acquiring data comparison information includes: a reception unit configured to receive first commodity information for price comparison sent by a terminal; a searching unit configured to determine whether a price comparison result associated with the first commodity information for price comparison is saved; and a sending unit configured to, in response to the price comparison result being saved, send the price comparison result to the terminal.

In one embodiment, a system for acquiring data comparison information includes: a terminal and a server. The terminal includes: a switching unit configured to switch to a session window of a preset account in a social networking application, wherein the preset account is configured to provide an inquiry service for a target account; an acquisition unit configured to acquire first commodity information for price comparison input into the session window by a user, wherein the first commodity information is sent to the preset account by the target account and the target account corresponds to a client account of the social networking application used by the user; a first sending unit configured to send the first commodity information for price comparison to the server; a first reception unit configured to receive a price comparison result sent by the server; and a display unit configured to display the price comparison result in the session window. The server includes: a second reception unit configured to receive the first commodity information for price comparison sent by the terminal; a searching unit configured to determine whether the price comparison result associated with the first commodity information for price comparison is saved; and a second sending unit configured to, in response to the price comparison result being saved, send the price comparison result to the terminal.

In another embodiment, a non-transitory computer readable storage medium includes programming instructions for acquiring data comparison information. The programming instructions are configured to cause one or more data processors to execute certain operations. For example, a session window of a preset account is switched to in a social networking application, wherein the preset account is configured to provide an inquiry service for a target account; first commodity information for price comparison input into the session window by a user is acquired, wherein the first commodity information is sent to the preset account by the target account and the target account corresponds to a client account of the social networking application used by the user; the first commodity information for price comparison is sent to a server, so that the server determines whether a price comparison result associated with the first commodity information for price comparison is saved; the price comparison result sent by the server is received; and the price comparison result is displayed in the session window.

In yet another embodiment, a non-transitory computer readable storage medium includes programming instructions for acquiring data comparison information. The programming instructions are configured to cause one or more data processors to execute certain operations. For example, first commodity information for price comparison sent by a terminal is received; whether a price comparison result associated with the first commodity information for price comparison is saved is determined; and in response to the price comparison result being saved, the price comparison result is sent to the terminal.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
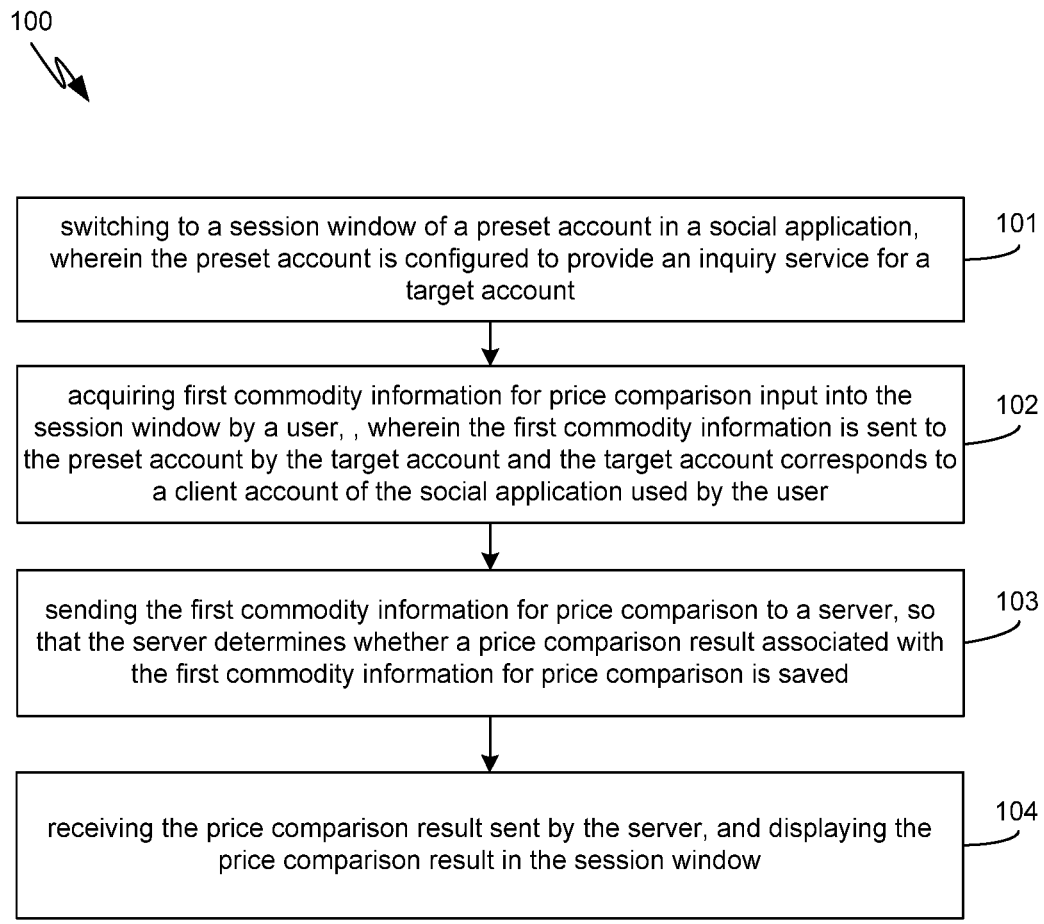
FIG. 1 is a simplified diagram showing a method for acquiring data comparison information according to one embodiment of the present invention.

FIG. 1 is a simplified diagram showing a method for acquiring data comparison information according to one embodiment of the present invention. The diagram is merely an example, which should not unduly limit the scope of the claims. One of ordinary skill in the art would recognize many variations, alternatives, and modifications. The method 100 includes processes 101-104. For example, the method 100 is applied to a terminal.

According to one embodiment, the process 101 includes: switching to a session window of a preset account in a social networking application, wherein the preset account is configured to provide an inquiry service for a target account. For example, the preset account is provided by a server of the social networking application (e.g., instant messaging software) and configured to provide an inquiry service for a user (e.g., a target account). As an example, the preset account is located on the server. As another example, the user logs in an account on the terminal, and communicates with the preset account provided by the server.

According to another embodiment, the process 102 includes: acquiring first commodity information for price comparison input into the session window by a user, wherein the first commodity information is sent to the preset account by the target account and the target account corresponds to a client account of the social networking application used by the user. For example, the data types of the first commodity information for price comparison include: text, recognizable identification, picture, audio, video, etc. As an example, texts can be acquired by inputting with an input method. As another example, a recognizable identification can be acquired via a recognizable identification reading application, such as two-dimensional code scanning software for obtaining two-dimensional codes. As yet another example, a picture can be acquired by shooting using a camera. As yet another example, audio data can be acquired through a recorder function using a microphone. As yet another example, video data can be acquired by recording using a camera/camcorder and/or a microphone. Data saved locally can be directly used as the first commodity information for price comparison, according to some embodiments.

According to yet another embodiment, the process 103 includes: sending the first commodity information for price comparison to a server, so that the server determines whether a price comparison result associated with the first commodity information for price comparison is saved. For example, after inputting the first commodity information for price comparison into the session window of the preset account, the user clicks a button "send" to send the information to the preset account (e.g., on a server). According to yet another embodiment, the process 104 includes: receiving the price comparison result sent by the server, and displaying the price comparison result in the session window.

The terminal directly switches to the session window of the preset account in the social networking application, and price comparison of a commodity is carried out in the session window, according to some embodiments. The server sends the price comparison result to the terminal based on the first commodity information for price comparison sent by the terminal, and the terminal displays the price comparison result in the session window, according to certain embodiments. A session with the preset account is directly started in the social networking application, and the price comparison of the first commodity information can be fulfilled without exiting the social networking application, so as to simplify the entire process and improve the efficiency of price comparison associated with the first commodity information.

Figure 2:
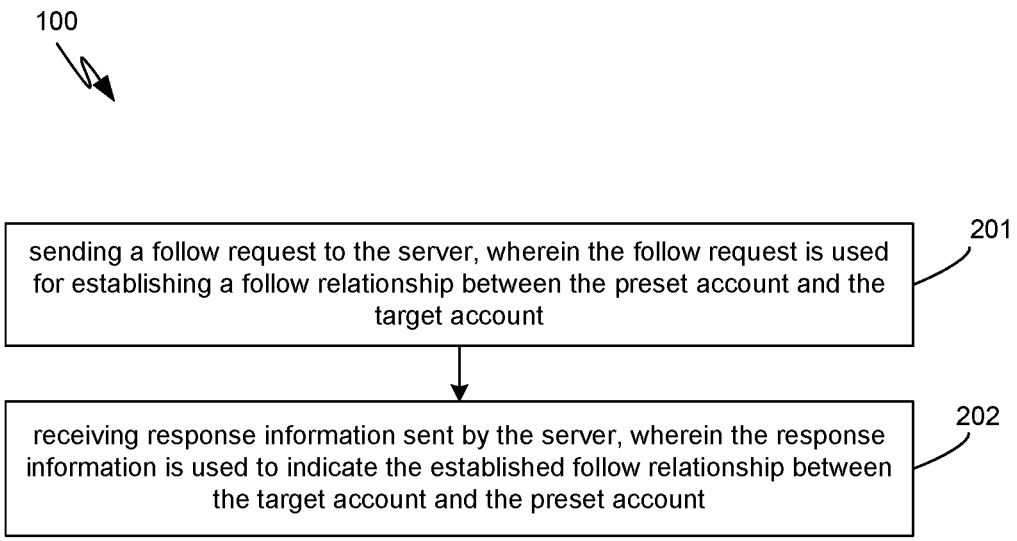
FIG. 2 is a simplified diagram showing a method for acquiring data comparison information according to another embodiment of the present invention.

FIG. 2 is a simplified diagram showing a method for acquiring data comparison information according to another embodiment of the present invention. The diagram is merely an example, which should not unduly limit the scope of the claims. One of ordinary skill in the art would recognize many variations, alternatives, and modifications.

According to one embodiment, before the process 101, the method 100 further includes the processes 201 and 202. For example, the process 201 includes: sending a follow request to the server, wherein the follow request is used for establishing a follow relationship between the preset account and the target account. For example, the follow request is used for the target account to follow the preset account. In another example, to establish a follow relationship between the target account and the preset account, the follow request is sent to the server. As an example, an independent public account catalog is set up in an address list, and followed preset accounts are displayed. As another example, a preset account searching interface is entered into for searching, using keywords, one or more preset accounts that are not followed.

According to another embodiment, the process 202 includes: receiving response information sent by the server, wherein the response information is used to indicate the established follow relationship between the target account and the preset account. For example, after receiving the response information, the preset account to be followed is added into the preset account catalog. The follow relationship between the target account and the preset account can be established, so that the user does not need to temporarily follow the preset account and can directly open the session window of the preset account.

According to yet another embodiment, before the process 103, the method 100 further includes: receiving and displaying second commodity information sent by the server, the second commodity information being similar to the first commodity information for price comparison; or receiving and displaying prompt information sent by the server, wherein the prompt information is used to query the user whether one or more other services are needed and the one or more other services include an artificial voice service or an intelligent voice service. For example, the received second commodity information or prompt information is displayed, so that a user can carry out follow-up operations according to the displayed second commodity information or prompt information. As an example, the first commodity information is associated with one or more first commodities, and the second commodity information is associated with one or more second commodities. As another example, the one or more first commodities are of a same commodity type as the one or more second commodities, and the price of the one or more first commodities is similar to that of the one or more second commodities. As yet another example, the one or more first commodities are of a same commodity type as the one or more second commodities, the one or more first commodities are of a same brand type as the one or more second commodities, and the model of the one or more first commodities is similar to that of the one or more second commodities.

The second commodity information similar to the first commodity information for price comparison or the prompt information can be provided to the user when the first commodity information for price comparison is not found, so that the user can query the second commodity information similar to the first commodity information for price comparison according to the displayed information or carry out voice operations according to the prompt information, according to some embodiments.

Figure 3:
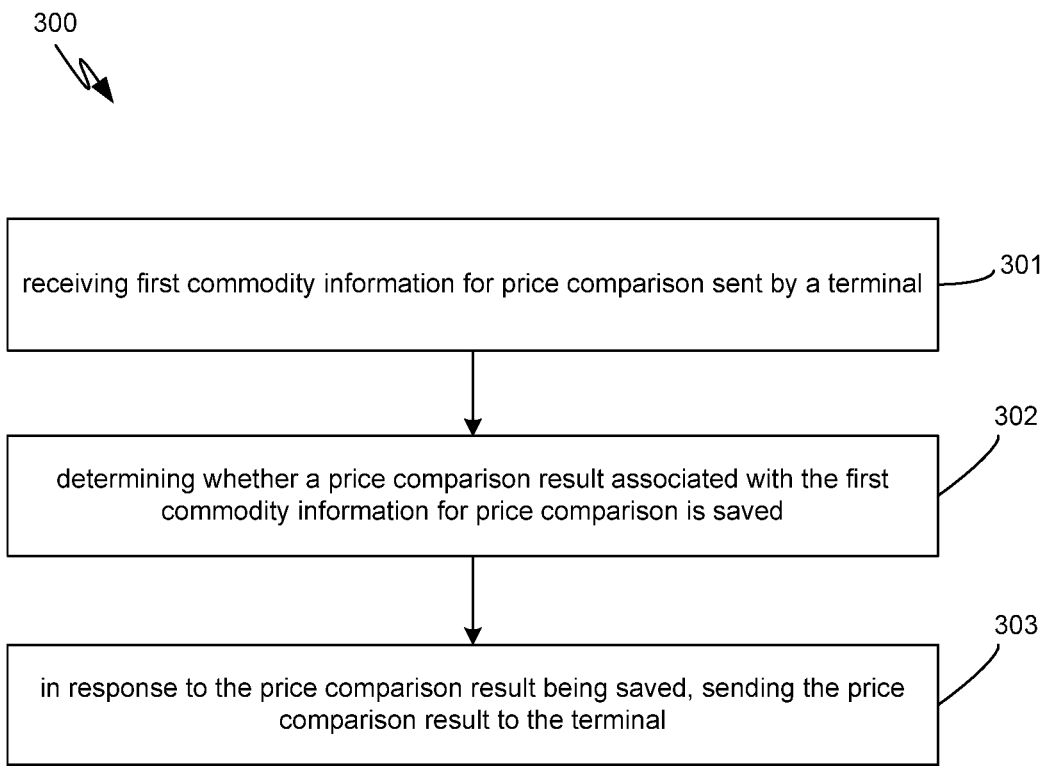
FIG. 3 is a simplified diagram showing a method for acquiring data comparison information according to yet another embodiment of the present invention.

FIG. 3 is a simplified diagram showing a method for acquiring data comparison information according to yet another embodiment of the present invention. The diagram is merely an example, which should not unduly limit the scope of the claims. One of ordinary skill in the art would recognize many variations, alternatives, and modifications. The method 300 includes processes 301-303.

According to one embodiment, the process 301 includes: receiving first commodity information for price comparison sent by a terminal. For example, the process 302 includes: determining whether a price comparison result associated with the first commodity information for price comparison is saved. As an example, whether a particular price comparison result associated with the first commodity information for price comparison is saved in a local database is determined based on all price comparison results saved in the local database. For example, a mapping relationship between commodity information and price comparison results is saved in the database, and the received first commodity information for price comparison is compared with second commodity information saved in the database. If matching commodity information is found, a comparison result corresponding to the matching commodity information is read. According to another embodiment, the process 303 includes: in response to the price comparison result being saved, sending the price comparison result to the terminal.

Whether a price comparison result associated with the first commodity information for price comparison is saved in the server can be determined based on the first commodity information for price comparison sent by the terminal, and if the price comparison result exists (e.g., in the local database), the price comparison result is sent to the terminal, according to some embodiments. A conventional social networking application server cannot perform price comparison of commodity information, so that a price comparison service is unavailable to a terminal. In comparison, using the method 300, the social networking application on the server can perform feeding back the price comparison result associated with the first commodity information, so that the user can compare the prices of commodities using the social networking application on the terminal.

Figure 4:
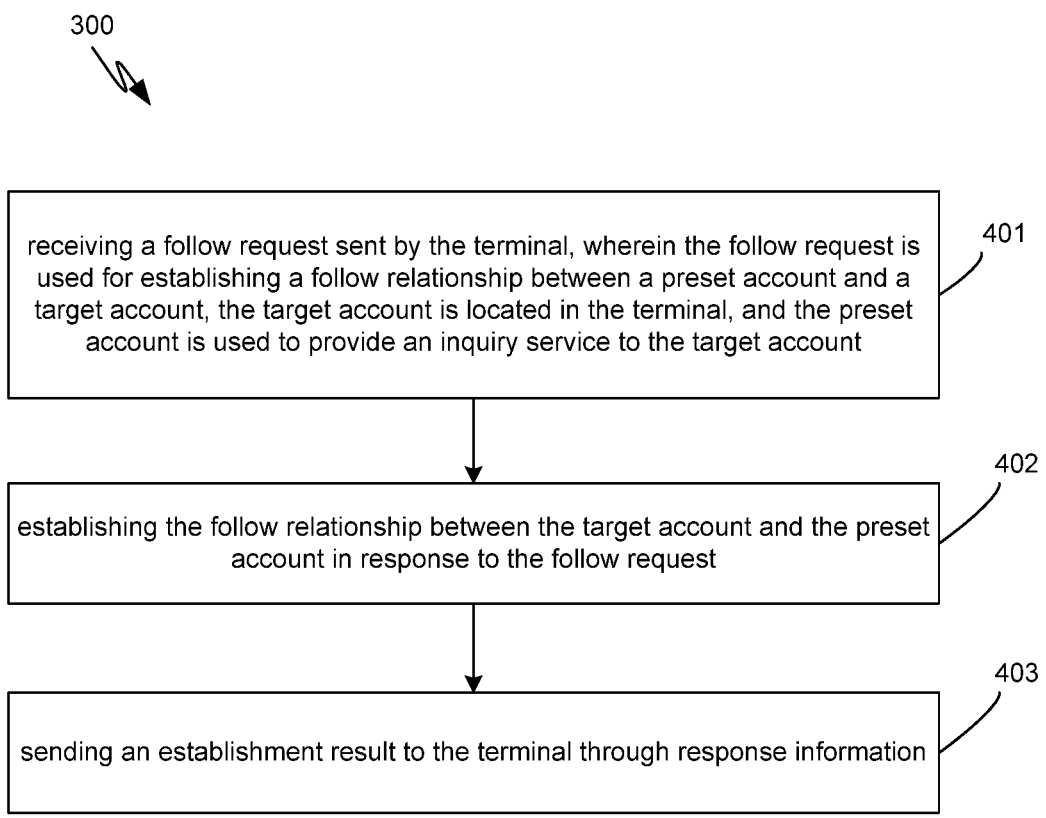
FIG. 4 is a simplified diagram showing a method for acquiring data comparison information according to yet another embodiment of the present invention.

FIG. 4 is a simplified diagram showing a method for acquiring data comparison information according to yet another embodiment of the present invention. The diagram is merely an example, which should not unduly limit the scope of the claims. One of ordinary skill in the art would recognize many variations, alternatives, and modifications.

According to one embodiment, before the process 301, the method 300 further includes: processes 401-403. For example, the process 401 includes: receiving a follow request sent by the terminal; wherein: the follow request is used for establishing a follow relationship between a preset account and a target account; the target account is located in the terminal; and the preset account is used to provide an inquiry service to the target account. As an example, the process 402 includes: establishing the follow relationship between the target account and the preset account in response to the follow request. As another example, the process 403 includes: sending an establishment result to the terminal through response information.

According to another embodiment, after the process 302, the method 300 further includes: in response to the price comparison result not being saved, sending second commodity information similar to the first commodity information for price comparison to the terminal. For example, if the price comparison result associated with the first commodity information for price comparison is not saved in the local database, the second commodity information similar to the first commodity information for price comparison is selected based on parameters of the first commodity information for price comparison. As an example, the parameters include manufacturer, brand, model, price, etc.

According to yet another embodiment, after the process 302, the method 300 further includes: in response to the price comparison result not being saved, sending prompt information to the terminal; wherein: the prompt information is used to query a user whether one or more other services are needed; and the one or more other services include an artificial voice service or an intelligent voice service. As an example, the user can carry out follow-up operations, such as making a consulting call, according to the prompt information.

The second commodity information similar to the first commodity information for price comparison or the prompt information can be provided to the user when the first commodity information for price comparison is not found, so that the user can query the second commodity information similar to the first commodity information for price comparison according to the displayed information or carry out voice operations according to the prompt information, according to some embodiments.

Figure 5:
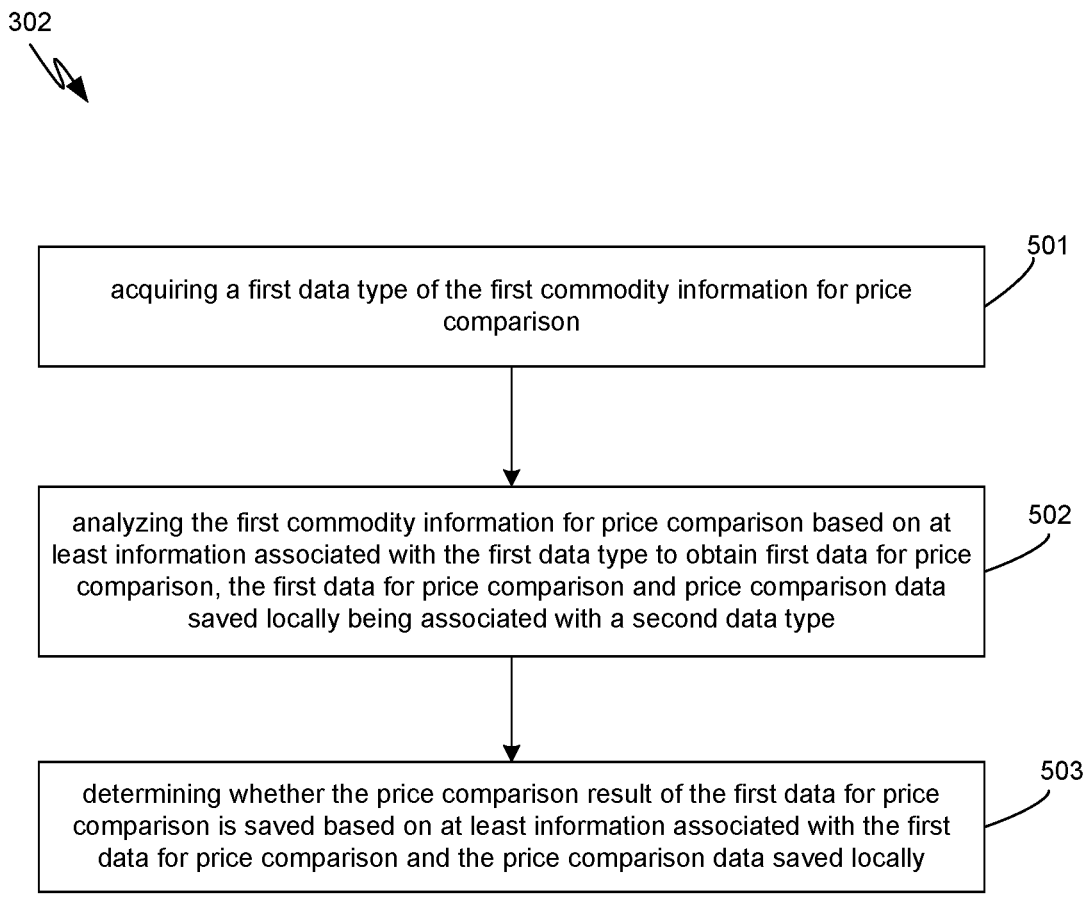
FIG. 5 is a simplified diagram showing a process for determining whether a price comparison result associated with the first commodity information for price comparison is saved as part of the method as shown in FIG. 3 according to one embodiment of the present invention.

FIG. 5 is a simplified diagram showing a process for determining whether a price comparison result associated with the first commodity information for price comparison is saved as part of the method 300 according to one embodiment of the present invention. The diagram is merely an example, which should not unduly limit the scope of the claims. One of ordinary skill in the art would recognize many variations, alternatives, and modifications.

According to one embodiment, the process 302 includes: sub-processes 501-503. For example, the sub-process 501 includes: acquiring one or more first data types of the first commodity information for price comparison. For example, the one or more first data types of the first commodity information for price comparison can be acquired via flag bits. As an example, the flag bit "1" represents that the data type is text, the flag bit "2" represents that the data type is picture, and the flag bit "3" represents that the data type is a two-dimensional code. The flag bit "4" represents that the data type is audio, and the flag bit "5" represents that the data type is video.

According to another embodiment, the process 502 includes: analyzing the first commodity information for price comparison based on at least information associated with the one or more first data types to obtain first data for price comparison, the first data for price comparison and price comparison data saved locally being associated with a second data type. For example, the second data type of the price comparison data saved locally is text, picture or recognizable identification (such as a two-dimensional code). As an example, the first commodity information for price comparison is processed according to the first data types of the first commodity information as follows. If the first data types of the first commodity information for price comparison include voice information, the voice information is converted into text information according to a mapping table of characters and voices. For example, the mapping table is used to record the correspondence between text information and video information, and recognize voice information as text information. If the first data types of the first commodity information for price comparison include video information, text information or picture information is extracted from the video information. If the first data types of the first commodity information for price comparison include text, picture or recognizable identification, format conversion or information extraction is not needed. The converted first commodity information, in the format of picture, text or recognizable identification, corresponds to the first data for price comparison.

According to yet another embodiment, the process 503 includes: determining whether the price comparison result of the first data for price comparison is saved based on at least information associated with the first data for price comparison and the price comparison data saved locally. For example, the price comparison data saved locally includes commodity information and price comparison results. As an example, if the first data for price comparison is the same as the commodity information, it is determined that the price comparison result of the first data for price comparison is saved. Otherwise, it is determined that the price comparison result of the first data for price comparison is not saved. For example, whether the price comparison result is saved is determined based on at least information associated with the first data for price comparison in a text format and the price comparison data in a text format. In another example, whether the price comparison result is saved is determined based on at least information associated with the first data for price comparison in a picture format and the price comparison data in a picture format. In yet another example, whether the price comparison result is saved is determined based on at least information associated with the first data for price comparison in a recognizable identification format and the price comparison data in a recognizable identification format. As an example, the recognizable identification is a bar code, a two-dimensional code or a three-dimensional code.

The first commodity information for price comparison in different formats can be converted into a picture format or a text format, so that price comparison using price comparison data locally saved on a server can be performed, according to some embodiments. As the first commodity information for price comparison in different formats can be analyzed to obtain an inquiry result, a user can input the first commodity information for price comparison in multiple manners, such as scanning a two-dimensional code, taking a picture of a commodity, recording audio about characteristics of the commodity, shooting a video of the commodity, etc., according to certain embodiments.

According to some embodiments, the method 100 as shown in FIG. 1 and FIG. 2 or the method 300 as shown in FIG. 3-FIG. 5 is applied in the following scenario. For example, a user logs into a client of a social networking application (e.g., WeChat). A target account used by the user follows a preset account. The user opens a session interface with another user in the social networking application, and needs a price comparison for a commodity. The user opens a session interface associated with the preset account, inputs first commodity information (e.g., a picture, a model or a two-dimensional code) for price comparison, and clicks a button to send the first commodity information. As an example, a terminal receives data fed back by a server, wherein the fed-back data can be a price comparison result associated with the first commodity information for price comparison (e.g., upon success of locating the price comparison result). As another example, the fed-back data can be second commodity information similar to the first commodity information for price comparison or prompt information (e.g., upon failure of locating the price comparison result).

Figure 6:
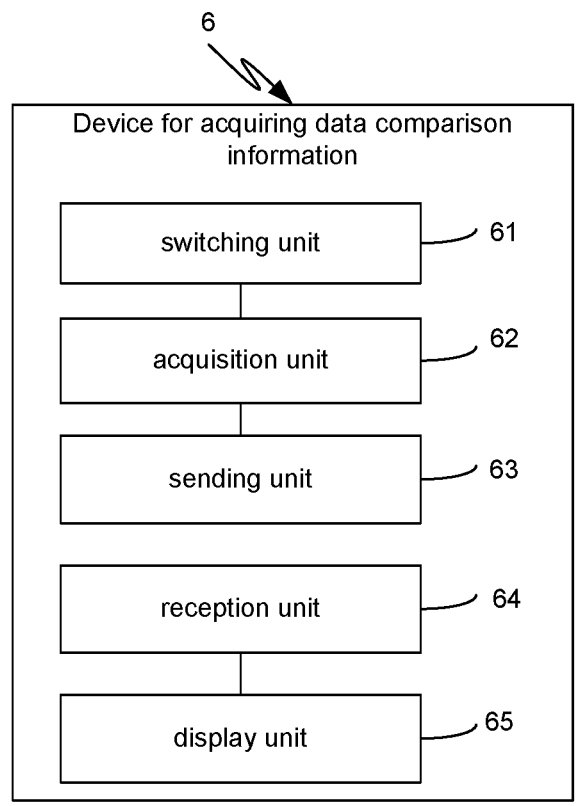
FIG. 6 is a simplified diagram showing a device for acquiring data comparison information according to one embodiment of the present invention.

FIG. 6 is a simplified diagram showing a device for acquiring data comparison information according to one embodiment of the present invention. The diagram is merely an example, which should not unduly limit the scope of the claims. One of ordinary skill in the art would recognize many variations, alternatives, and modifications. For example, the device 6 is applied to a terminal.

According to one embodiment, the device 6 includes: a switching unit 61 configured to switch to a session window of a preset account in a social networking application, wherein the preset account is configured to provide an inquiry service for a target account; an acquisition unit 62 configured to acquire first commodity information for price comparison input into the session window by a user, wherein the first commodity information is sent to the preset account by the target account and the target account corresponds to a client account of the social networking application used by the user; a sending unit 63 configured to send the first commodity information for price comparison to a server, so that the server determines whether a price comparison result associated with the first commodity information for price comparison is saved; a reception unit 64 configured to receive the price comparison result sent by the server; and a display unit 65 configured to display the price comparison result in the session window.

According to another embodiment, the sending unit 63 is further configured to send a follow request to the server, wherein the follow request is used for establishing a follow relationship between the preset account and the target account. For example, the reception unit 64 is further configured to receive response information sent by the server, wherein the response information is used to indicate the established follow relationship between the target account and the preset account.

According to yet another embodiment, the reception unit 64 is further configured to receive second commodity information sent by the server, the second commodity information being similar to the first commodity information for price comparison. For example, the display unit 65 is further configured to display the second commodity information. According to yet another embodiment, the reception unit 64 is further configured to receive prompt information sent by the server. As an example, the display unit 65 is further configured to display the prompt information. The prompt information is used to query the user whether one or more other services are needed. The one or more other services include an artificial voice service or an intelligent voice service.

Figure 7:
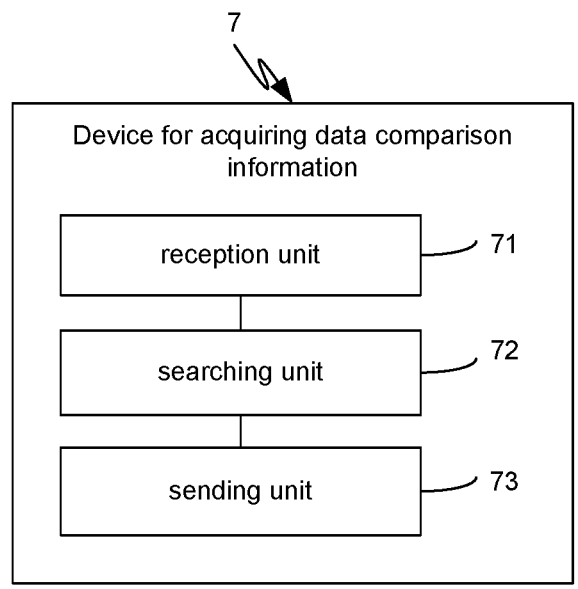
FIG. 7 is a simplified diagram showing a device for acquiring data comparison information according to another embodiment of the present invention.

FIG. 7 is a simplified diagram showing a device for acquiring data comparison information according to another embodiment of the present invention. The diagram is merely an example, which should not unduly limit the scope of the claims. One of ordinary skill in the art would recognize many variations, alternatives, and modifications. For example, the device 7 is applied to a server.

According to one embodiment, the device 7 includes: a reception unit 71 configured to receive first commodity information for price comparison sent by a terminal; a searching unit 72 configured to determine whether a price comparison result associated with the first commodity information for price comparison is saved; and a sending unit 73 configured to, in response to the price comparison result being saved, send the price comparison result to the terminal.

Figure 8:
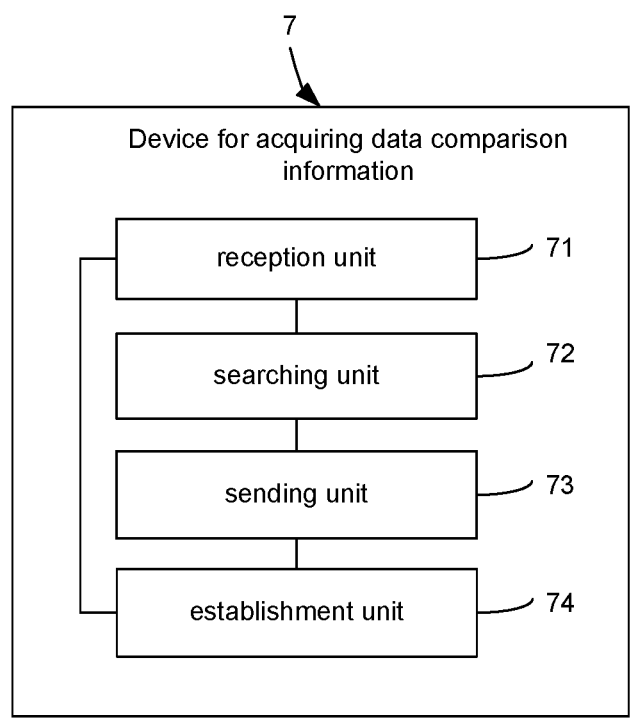
FIG. 8 is a simplified diagram showing a device for acquiring data comparison information according to yet another embodiment of the present invention.

FIG. 8 is a simplified diagram showing a device for acquiring data comparison information according to yet another embodiment of the present invention. The diagram is merely an example, which should not unduly limit the scope of the claims. One of ordinary skill in the art would recognize many variations, alternatives, and modifications.

According to one embodiment, the reception unit 71 is further configured to receive a follow request sent by the terminal, wherein the follow request is used for establishing a follow relationship between a preset account and a target account. For example, the target account is located in the terminal. As an example, the preset account is used to provide an inquiry service to the target account.

According to another embodiment, the device 7 further includes: an establishment unit 74 configured to establish the follow relationship between the target account and the preset account in response to the follow request. For example, the sending unit 73 is further configured to send an establishment result to the terminal through response information.

In one embodiment, the sending unit 73 is further configured to: in response to the price comparison result not being saved, send second commodity information similar to the first commodity information for price comparison to the terminal. In another embodiment, the sending unit 73 is further configured to: in response to the price comparison result not being saved, send prompt information to the terminal. For example, the prompt information is used to query a user whether one or more other services are needed. As an example, the one or more other services include an artificial voice service or an intelligent voice service.

Figure 9:
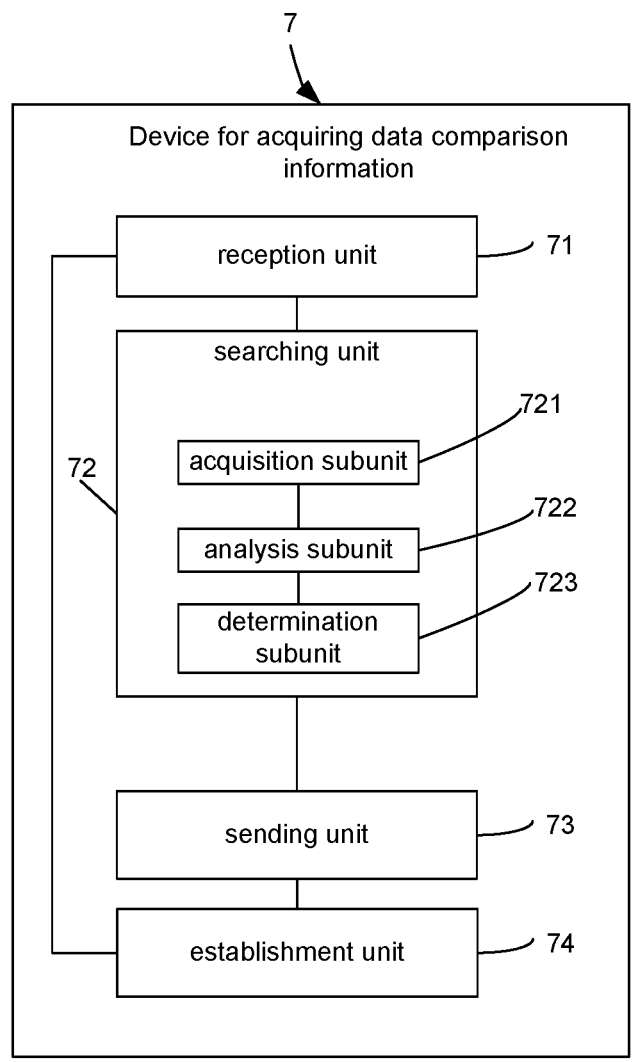
FIG. 9 is a simplified diagram showing a device for acquiring data comparison information according to yet another embodiment of the present invention.

FIG. 9 is a simplified diagram showing a device for acquiring data comparison information according to yet another embodiment of the present invention. The diagram is merely an example, which should not unduly limit the scope of the claims. One of ordinary skill in the art would recognize many variations, alternatives, and modifications.

According to one embodiment, the searching unit 72 includes: an acquisition subunit 721 configured to acquire one or more first data types of the first commodity information for price comparison; an analysis subunit 722 configured to analyze the first commodity information for price comparison based on at least information associated with the one or more first data types to obtain first data for price comparison, the first data for price comparison and price comparison data saved locally being associated with a second data type; and a determination subunit 723 configured to determine whether the price comparison result of the first data for price comparison is saved based on at least information associated with the first data for price comparison and the price comparison data saved locally.

According to another embodiment, the second data type of the price comparison data corresponds to text, picture or recognizable identification. For example, the analysis subunit 722 is further configured to: in response to the commodity information for price comparison including voice information, convert the voice information into text information according to a mapping table of characters and voices; and in response to the commodity information for price comparison includes video information, extract text information or picture information from the video information. As an example, the determination subunit 723 is further configured to: determine whether the price comparison result is saved based on at least information associated with the first data for price comparison in a text format and the price comparison data in a text format; or determine whether the price comparison result is saved based on at least information associated with the first data for price comparison in a picture format and the price comparison data in a picture format; or determine whether the price comparison result is saved based on at least information associated with the first data for price comparison in a recognizable identification format and the price comparison data in a recognizable identification format.

Figure 10:
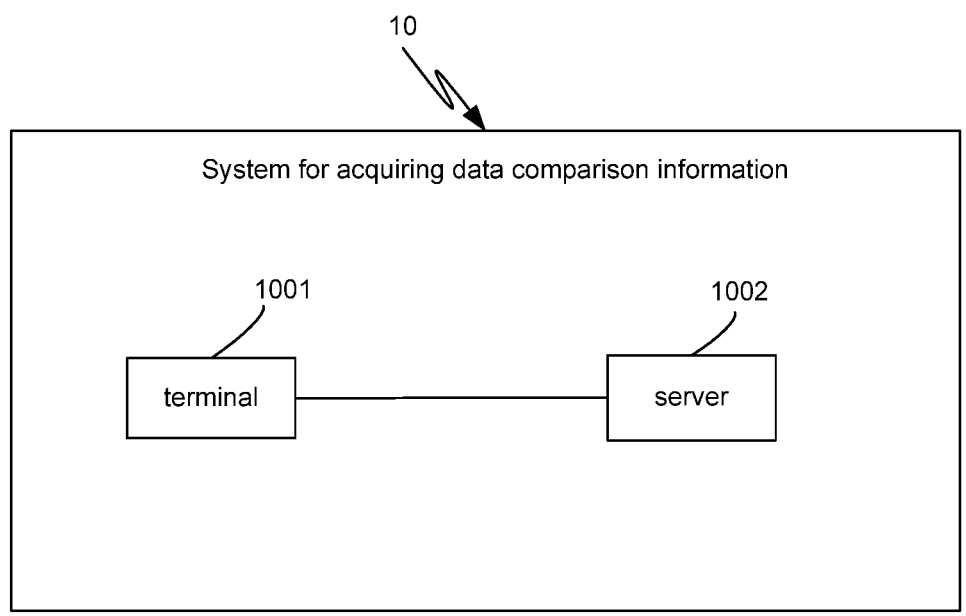
FIG. 10 is a simplified diagram showing a system for acquiring data comparison information according to one embodiment of the present invention.

FIG. 10 is a simplified diagram showing a system for acquiring data comparison information according to one embodiment of the present invention. The diagram is merely an example, which should not unduly limit the scope of the claims. One of ordinary skill in the art would recognize many variations, alternatives, and modifications.

According to one embodiment, the system 10 includes a terminal 1001 and a server 1002. As an example, the terminal 1001 includes the device 6. For example, the server 1002 includes the device 7.

Figure 11:
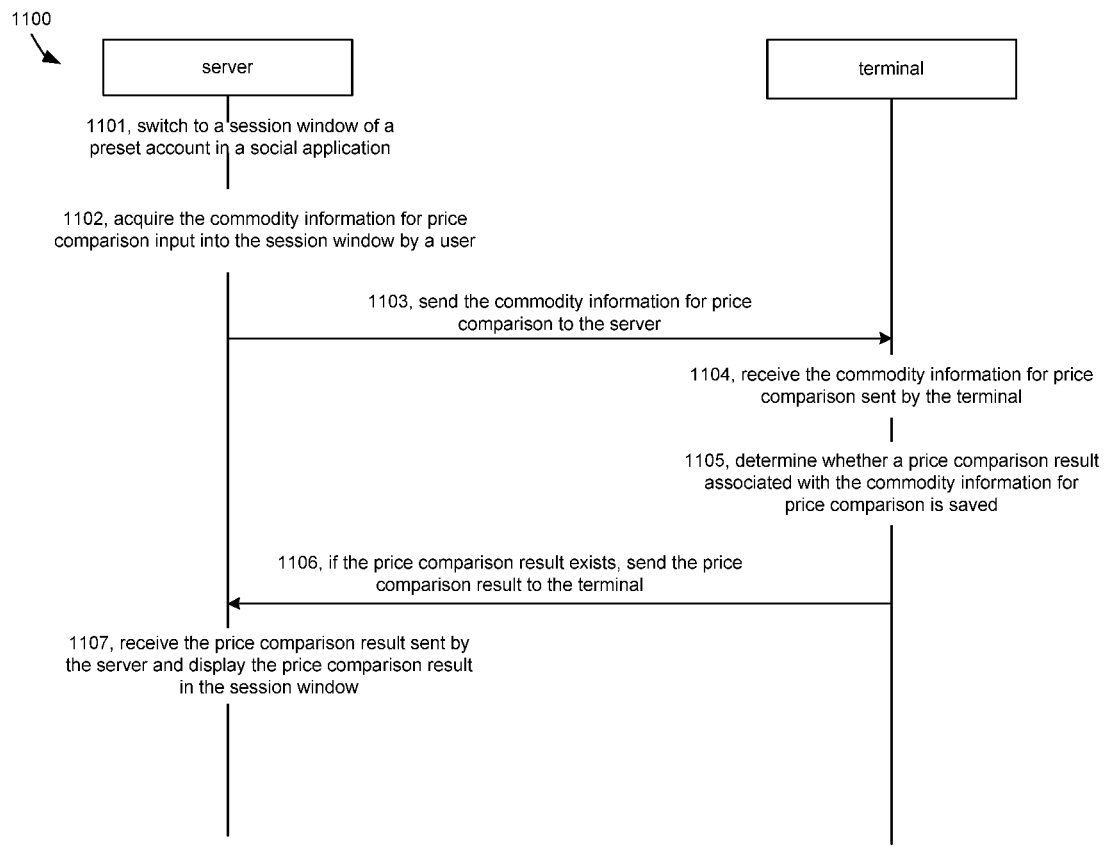
FIG. 11 is a simplified diagram showing a method for acquiring data comparison information according to yet another embodiment of the present invention.

FIG. 11 is a simplified diagram showing a method for acquiring data comparison information according to yet another embodiment of the present invention. The diagram is merely an example, which should not unduly limit the scope of the claims. One of ordinary skill in the art would recognize many variations, alternatives, and modifications. The method 1100 includes processes 1101-1107.

According to one embodiment, a target account follows a preset account. As shown in FIG. 11, during the process 1101, the terminal switches to a session window of a preset account in a social networking application, according to some embodiments. For example, during the process 1102, the terminal acquires commodity information for price comparison input into the session window by a user. As an example, during the process 1103, the terminal sends the commodity information for price comparison to the server. As another example, during the process 1104, the server receives the commodity information for price comparison sent by the terminal. As yet another example, during the process 1105, the server determines whether a price comparison result associated with the commodity information for price comparison is saved. As yet another example, during the process 1106, if the price comparison result exists, the server sends the price comparison result to the terminal. As yet another example, during the process 1107, the terminal receives the price comparison result sent by the server, and displays the price comparison result in the session window.

According to another embodiment, a method is provided for acquiring data comparison information. For example, a session window of a preset account is switched to in a social networking application, wherein the preset account is configured to provide an inquiry service for a target account; first commodity information for price comparison input into the session window by a user is acquired, wherein the first commodity information is sent to the preset account by the target account and the target account corresponds to a client account of the social networking application used by the user; the first commodity information for price comparison is sent to a server, so that the server determines whether a price comparison result associated with the first commodity information for price comparison is saved; the price comparison result sent by the server is received; and the price comparison result is displayed in the session window. For example, the method is implemented according to at least FIG. 1, FIG. 2, and/or FIG. 11.

According to another embodiment, a method is provided for acquiring data comparison information. For example, first commodity information for price comparison sent by a terminal is received; whether a price comparison result associated with the first commodity information for price comparison is saved is determined; and in response to the price comparison result being saved, the price comparison result is sent to the terminal. For example, the method is implemented according to at least FIG. 3, FIG. 4, FIG. 5, and/or FIG. 11.

According to yet another embodiment, a device for acquiring data comparison information includes: a switching unit configured to switch to a session window of a preset account in a social networking application, wherein the preset account is configured to provide an inquiry service for a target account; an acquisition unit configured to acquire first commodity information for price comparison input into the session window by a user, wherein the first commodity information is sent to the preset account by the target account and the target account corresponds to a client account of the social networking application used by the user; a sending unit configured to send the first commodity information for price comparison to a server, so that the server determines whether a price comparison result associated with the first commodity information for price comparison is saved; a reception unit configured to receive the price comparison result sent by the server; and a display unit configured to display the price comparison result in the session window. For example, the device is implemented according to at least FIG. 6.

According to yet another embodiment, a device for acquiring data comparison information includes: a reception unit configured to receive first commodity information for price comparison sent by a terminal; a searching unit configured to determine whether a price comparison result associated with the first commodity information for price comparison is saved; and a sending unit configured to, in response to the price comparison result being saved, send the price comparison result to the terminal. For example, the device is implemented according to at least FIG. 7, FIG. 8, and/or FIG. 9.

In one embodiment, a system for acquiring data comparison information includes: a terminal and a server. The terminal includes: a switching unit configured to switch to a session window of a preset account in a social networking application, wherein the preset account is configured to provide an inquiry service for a target account; an acquisition unit configured to acquire first commodity information for price comparison input into the session window by a user, wherein the first commodity information is sent to the preset account by the target account and the target account corresponds to a client account of the social networking application used by the user; a first sending unit configured to send the first commodity information for price comparison to the server; a first reception unit configured to receive a price comparison result sent by the server; and a display unit configured to display the price comparison result in the session window. The server includes: a second reception unit configured to receive the first commodity information for price comparison sent by the terminal; a searching unit configured to determine whether the price comparison result associated with the first commodity information for price comparison is saved; and a second sending unit configured to, in response to the price comparison result being saved, send the price comparison result to the terminal. For example, the system is implemented according to at least FIG. 10.

In another embodiment, a non-transitory computer readable storage medium includes programming instructions for acquiring data comparison information. The programming instructions are configured to cause one or more data processors to execute certain operations. For example, a session window of a preset account is switched to in a social networking application, wherein the preset account is configured to provide an inquiry service for a target account; first commodity information for price comparison input into the session window by a user is acquired, wherein the first commodity information is sent to the preset account by the target account and the target account corresponds to a client account of the social networking application used by the user; the first commodity information for price comparison is sent to a server, so that the server determines whether a price comparison result associated with the first commodity information for price comparison is saved; the price comparison result sent by the server is received; and the price comparison result is displayed in the session window. For example, the storage medium is implemented according to at least FIG. 1, FIG. 2, and/or FIG. 11.

In yet another embodiment, a non-transitory computer readable storage medium includes programming instructions for acquiring data comparison information. The programming instructions are configured to cause one or more data processors to execute certain operations. For example, first commodity information for price comparison sent by a terminal is received; whether a price comparison result associated with the first commodity information for price comparison is saved is determined; and in response to the price comparison result being saved, the price comparison result is sent to the terminal. For example, the storage medium is implemented according to at least FIG. 3, FIG. 4, FIG. 5, and/or FIG. 11.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for acquiring data comparison information using a social networking application performed at a computing device having one or more processors and memory storing programs to be executed by the one or more processors, the method comprising:

displaying, in the social networking application, a chat window between a target account and a second account, the target account corresponding to a first client account of the social networking application used by a user of the computing device and the second account corresponding to a second client account of the social networking application;

in response to a user instruction detected by the computing device, switching from the chat window to a session window of a preset account in the social networking application, wherein the preset account is configured to provide an inquiry service for the target account;

acquiring first commodity information about a first commodity input into the session window by a user, wherein the first commodity information is retrieved from the chat window and sent to the preset account by the target account;

sending the first commodity information to a server, so that the server determines whether a price comparison result associated with the first commodity is saved;

receiving, from the server, and displaying in the session window the price comparison result associated with the first commodity sent by the server; and in response to the price comparison result associated with the first commodity not being saved, receiving, from the server, and displaying in the session window another price comparison result associated with a second commodity, the second commodity being similar to the first commodity.

2. The method of claim 1, further comprising:

sending a follow request to the server, wherein the follow request is used for establishing a follow relationship between the preset account and the target account; and receiving response information sent by the server, wherein the response information is used to indicate the established follow relationship between the target account and the preset account.

3. The method of claim 2, further comprising:

receiving prompt information sent by the server; and displaying the prompt information;

wherein:

the prompt information is used to query the user whether one or more other services are needed; and the one or more other services include an artificial voice service or an intelligent voice service.

4. A computing device for acquiring data comparison information using a social networking application, the device comprising:

a storage having instructions stored thereon; and one or more processors, when executing the instructions, configured to;

display, in the social networking application, a chat window between a target account and a second account, the target account corresponding to a first client account of the social networking application used by a user of the computing device and the second account corresponding to a second client account of the social networking application;

in response to a user instruction detected by the computing device, switch from the chat window to a session window of a preset account in the social networking application, wherein the preset account is configured to provide an inquiry service for the target account;

acquire first commodity information about a first commodity input into the session window by a user, wherein the first commodity information is retrieved from the chat window and sent to the preset account by the target account;

send the first commodity information to a server, so that the server determines whether a price comparison result associated with the first commodity information is saved;

receive, from the server, and display in the session window the price comparison result associated with the first commodity sent by the server in a case that the price comparison result associated with the first commodity is saved; and in response to the price comparison result associated with the first commodity not being saved, receive, from the server, and display in the session window another price comparison result about a second commodity, the second commodity being similar to the first commodity.

5. The device of claim 4, wherein the one or more processors, when executing the instructions, are further configured to:

send a follow request to the server, wherein the follow request is used for establishing a follow relationship between the preset account and the target account; and receive response information sent by the server, wherein the response information is used to indicate the established follow relationship between the target account and the preset account.

6. The device of claim 5, wherein the one or more processors, when executing the instructions, are further configured to:

receive prompt information sent by the server; and display the prompt information;

wherein:

the prompt information is used to query the user whether one or more other services are needed; and the one or more other services include an artificial voice service or an intelligent voice service.

7. A method for acquiring data comparison information using a social networking application performed at a computing device having one or more processors and memory storing programs to be executed by the one or more processors, the method comprising:

displaying, in the social networking application, a chat window between a target account and a second account, the target account corresponding to a first client account of the social networking application used by a user of the computing device and the second account corresponding to a second client account of the social networking application;

in response to a user instruction detected by the computing device, switching from the chat window to a session window of a preset account in the social networking application, wherein the preset account is configured to provide an inquiry service for the target account;

acquiring first commodity information about a first commodity input into the session window by a user, wherein the first commodity information is retrieved from the chat window and sent to the preset account by the target account, and wherein the first commodity information includes a bar code, a two-dimensional code or a three-dimensional code of the first commodity;

sending the first commodity information to a server, so that the server determines a price comparison result associated with the first commodity according to the first commodity information;

receiving, from the server, and displaying in the session window the price comparison result associated with the first commodity sent by the server; and in response to the price comparison result associated with the first commodity not being saved, receiving, from the server, and displaying in the session window another price comparison result associated with a second commodity, the second commodity being similar to the first commodity.

\* \* \* \* \*